(12) United States Patent
Lv

(10) Patent No.: US 7,990,695 B2
(45) Date of Patent: Aug. 2, 2011

(54) KEY ASSEMBLY FOR AN ELECTRONIC DEVICE

(75) Inventor: Yue-Hui Lv, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 185 days.

(21) Appl. No.: 12/486,877

(22) Filed: Jun. 18, 2009

(65) Prior Publication Data

US 2010/0027202 A1 Feb. 4, 2010

(30) Foreign Application Priority Data

Jul. 30, 2008 (CN) .......................... 2008 1 0303209

(51) Int. Cl.
*G06F 1/16* (2006.01)
(52) U.S. Cl. ........... 361/679.3; 361/679.55; 361/679.56; 455/575.1; 455/575.4
(58) Field of Classification Search ............. 361/679.01; 200/341

See application file for complete search history.

(56) References Cited

U.S. PATENT DOCUMENTS

| | | | | |
|---|---|---|---|---|
| 5,749,457 A * | 5/1998 | Castaneda et al. | ............ | 200/343 |
| 6,148,183 A * | 11/2000 | Higdon et al. | ............ | 455/575.1 |
| 6,166,337 A * | 12/2000 | Flegeo | ............ | 200/5 A |
| 6,466,769 B1 * | 10/2002 | Kobayashi et al. | ............ | 455/90.1 |
| 6,984,793 B1 * | 1/2006 | Chew | ............ | 200/4 |
| 7,116,780 B2 * | 10/2006 | Sun | ............ | 379/433.01 |
| 7,492,602 B2 * | 2/2009 | Kim et al. | ............ | 361/752 |
| 7,633,030 B2 * | 12/2009 | Chang | ............ | 200/341 |
| 7,656,675 B2 * | 2/2010 | Kim et al. | ............ | 361/752 |
| 7,812,271 B2 * | 10/2010 | Lee et al. | ............ | 200/5 R |
| 7,868,945 B2 * | 1/2011 | Hong et al. | ............ | 348/373 |
| 2004/0240162 A1 * | 12/2004 | Hsu et al. | ............ | 361/680 |
| 2009/0223795 A1 * | 9/2009 | Lee et al. | ............ | 200/329 |

* cited by examiner

*Primary Examiner* — Jayprakash N Gandhi
*Assistant Examiner* — Anthony Q Edwards
(74) *Attorney, Agent, or Firm* — Steven M. Reiss

(57) ABSTRACT

A key assembly for an electronic device includes a key and a housing, the key being elastic and including a contact body and an assembly wall integrally formed with the contact body, the contact body has a protrusion formed thereon; and the housing has a shortened wall defining an aperture therein and a bottom wall protruding a column adjacent to the shortened wall. The key is mounted into the housing, the assembly wall is clipped to the column and the shortened wall, and the contact body abuts the shortened wall and the protrusion protrudes out of the aperture.

9 Claims, 4 Drawing Sheets

KEY ASSEMBLY FOR AN ELECTRONIC DEVICE

BACKGROUND

1. Technical Field

The present disclosure relates to key assemblies, particularly to a key assembly for an electronic device.

2. Description of Related Art

Portable electronic devices such as mobile phones and personal digital assistants (PDA) are widely used. Keypad assemblies are usually mounted to the electronic devices. Referring to FIG. 4, a frequently employed key assembly 30 includes a housing portion 32 defining a receiving cavity 322 and a key portion 34 mounted inside the receiving cavity 322. The key portion 34 has a resist post 342 and two latch portions 344, the resist post 342 extends through the receiving cavity 322 resisting a pad of a circuit board inside the electronic device. The latching portions 344 extend through the receiving cavity 322 for latching the key portion 34 with the housing portion 32. A spring 36 is mounted around the resisting post 342 and compressed between the bottom of the receiving cavity 322 and the key portion 34. During depression of the key portion 34, the resisting post 342 further extends inside the electronic device to contact the pad and thus the electronic device is activated. Upon release of the key portion 34, the spring 36 returns, impelling the key portion 34 away from the pad to its original position. However, this key assembly 30 is complex and thus not easy to assemble.

Therefore, there is room for improvement within the art.

BRIEF DESCRIPTION OF THE DRAWING

Many aspects of the present key assembly can be better understood with reference to the following drawings. The components in the various drawings are not necessarily drawn to scale, the emphasis instead being placed upon clearly illustrating the principles of the present key assembly for an electronic device. Moreover, in the drawings, like reference numerals designate corresponding parts throughout the diagrams.

DETAILED DESCRIPTION OF THE EMBODIMENT

Figure 1:
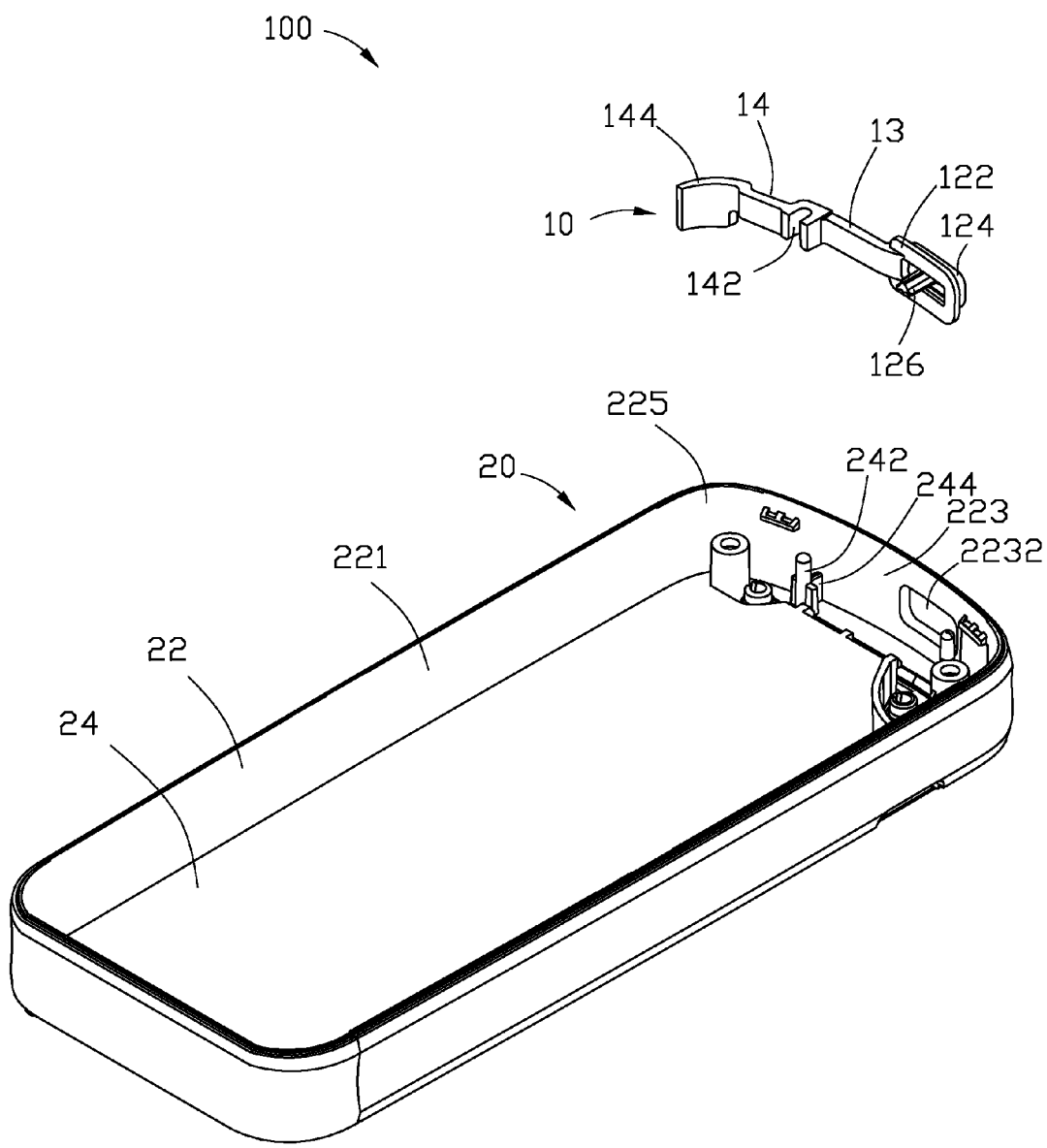
FIG. 1 is a disassembled view of the key assembly for an electronic device.

FIG. 1 shows a key assembly 100, which can be used in mobile phones and other portable electronic devices, such as personal digital assistants (PDAs), digital cameras, and others. The key assembly 100 includes a key 10 and a housing 20 receiving the key 10 therein.

Figure 2:
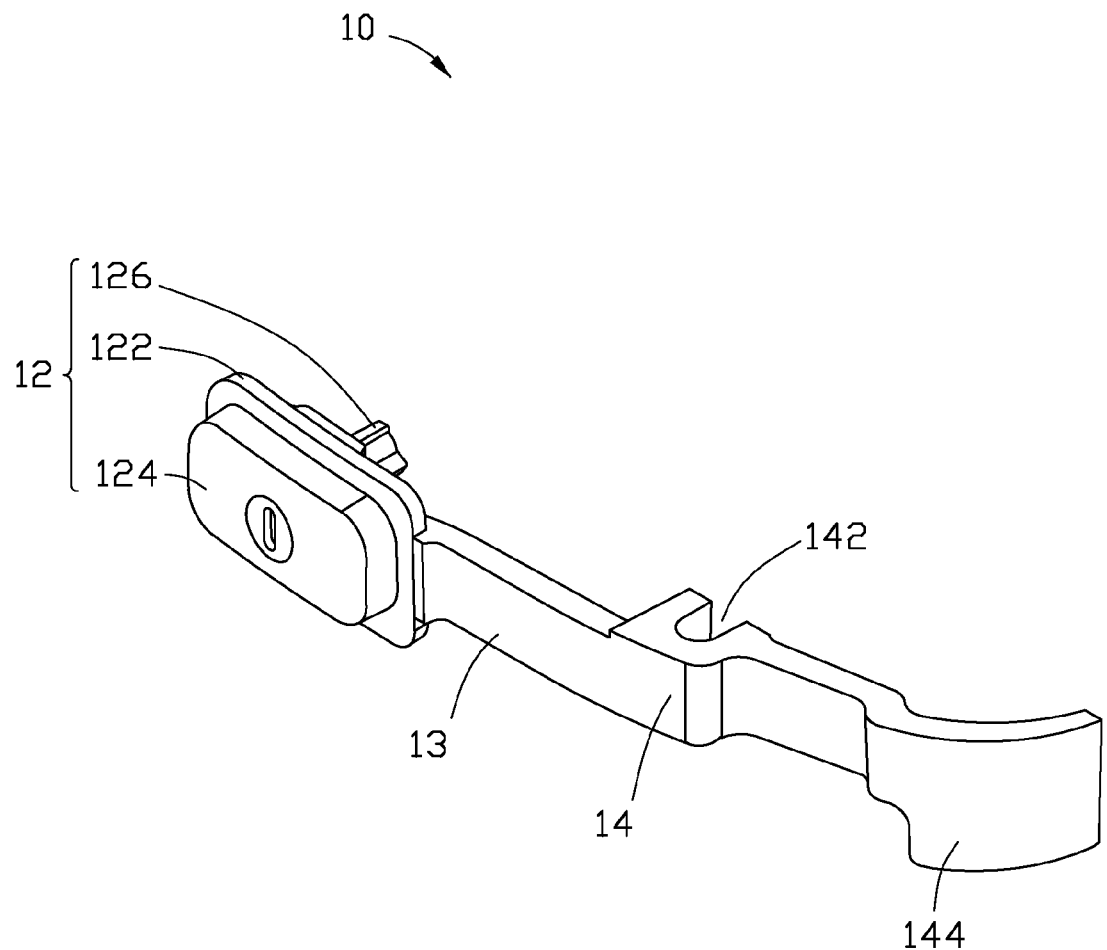
FIG. 2 is an isometric view of the key of the key assembly shown in FIG. 1.

Referring further to FIG. 2, the key 10 is generally elastic including a contact body 12, an assembly wall 14, and a connecting section 13 having two opposite ends connecting with the contact body 12 and the assembly wall 14 respectively.

The contact body 12 includes a main board 122 connecting with the connecting wall 13, a protrusion 124 protruding from the exterior lateral surface of the main board 122, and a resisting post 126 protruding from the interior lateral surface of the main board 122. The protrusion 124 facilitates the depression of contact body 12. The resisting post 126 moves along with the depression of the protrusion 124 to contact a switch (not shown) inside the electronic device.

The assembly wall 14 defines an assembly slot 142 in the interior lateral surface thereof. The assembly slot 142 latches with the housing 20. The assembly wall 14 includes an arcuate distal wall portion 144 distal to the connecting wall 13 for resisting the housing 20.

Referring back to FIG. 1, the housing 20 includes a peripheral wall 22 and a bottom wall 24 connected and surrounded by the peripheral wall 22. The peripheral wall 22 includes a lengthened wall 221, a shortened wall 223 and an arcuate wall 225 connecting the two. The shortened wall 223 defines an aperture 2232 engagingly receiving the protrusion 124. The bottom wall 24 has a column 242 protruding adjacent to the shortened wall 223, and a support block 244 between the shortened wall 223 and the column 242. The column 242 pivotally engages the assembly slot 142, and the support block 244 is configured for supporting the assembly wall 14 of the key 10.

Figure 3:
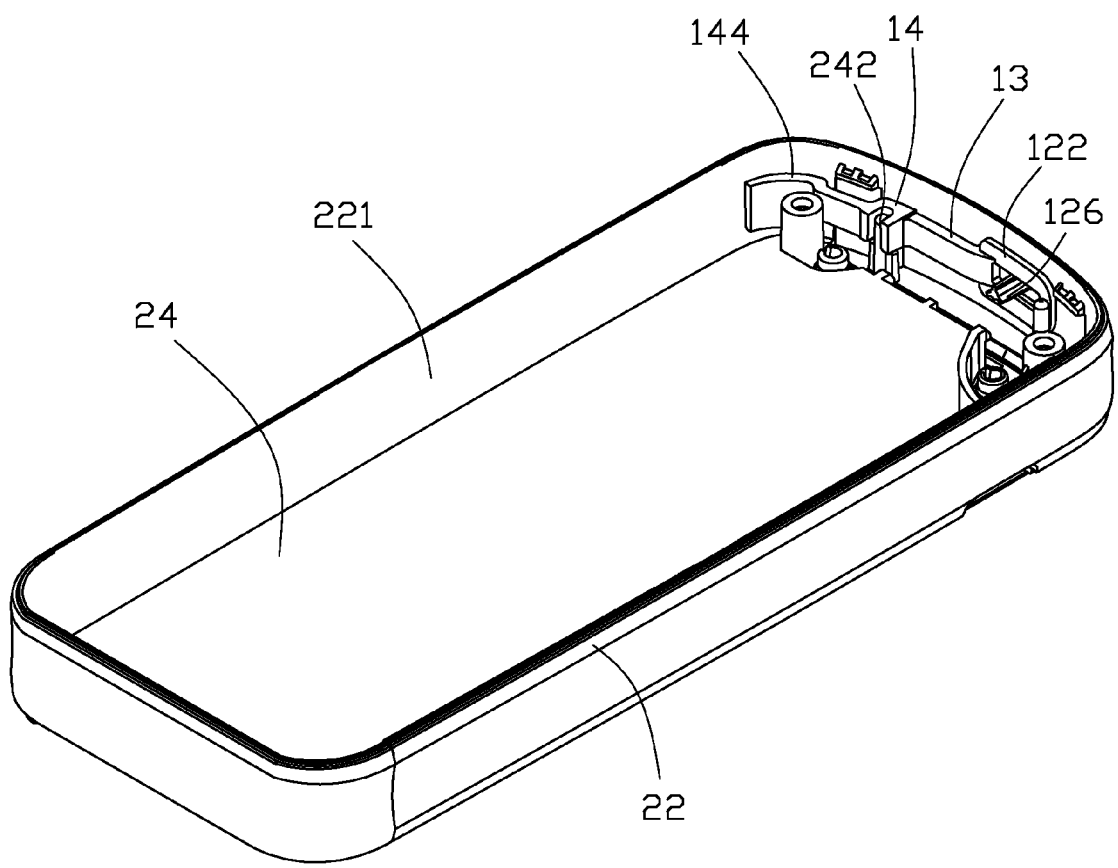
FIG. 3 is an assembled, isometric view of the key assembly shown in FIG. 1.
Figure 4:
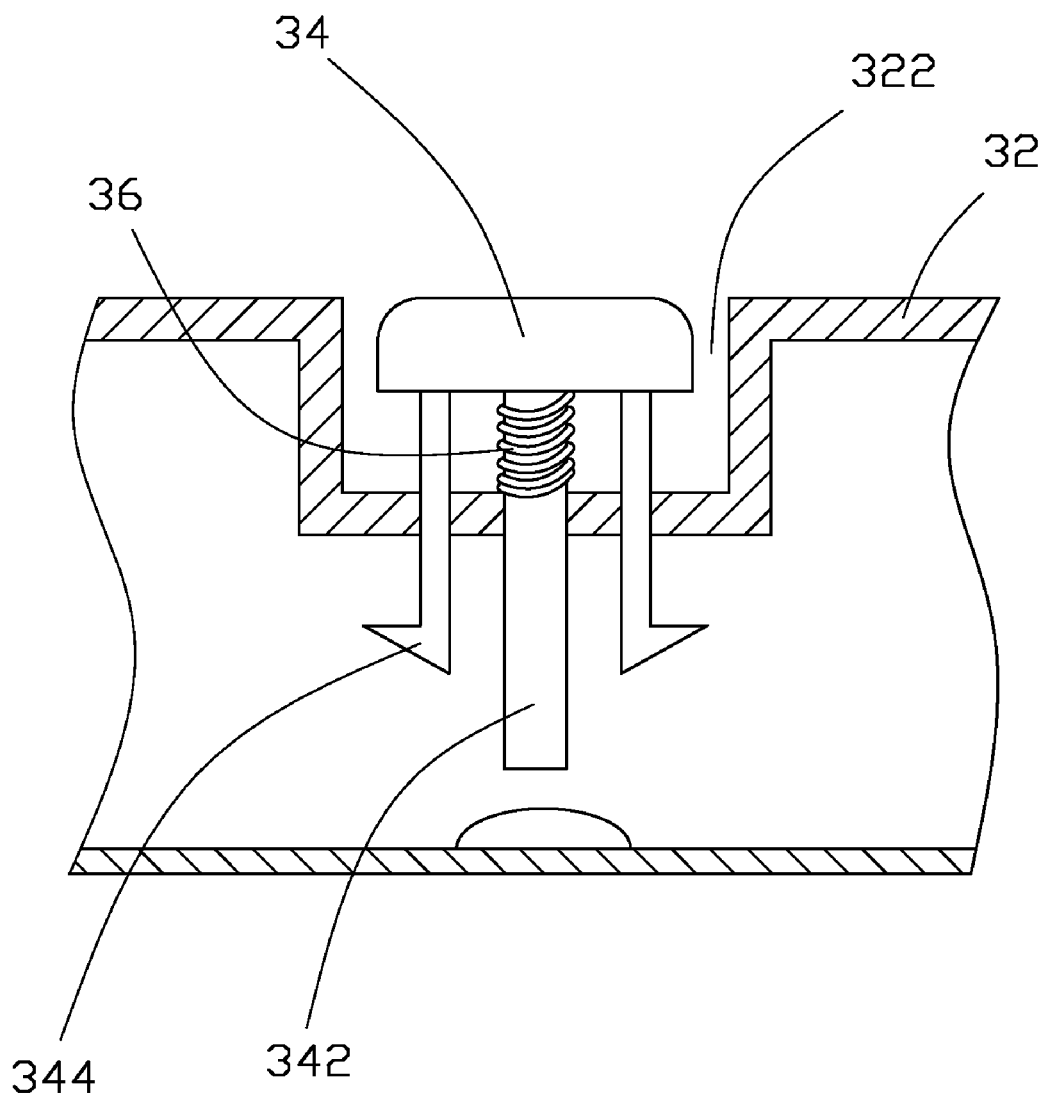
FIG. 4 is a sectional view of a frequently employed key assembly.

Referring to FIG. 3, the key 10 is securely assembled to the housing 20. The column 242 is latched into the assembly slot 142, and the assembly wall 14 is clipped between the column 242 and the shortened wall 223. The support block 244 supports the assembly wall 14, and the protrusion 124 of the contact body 12 protrudes out of the aperture 2232 of the shortened wall 223 and the main board 122 abuts the lateral interior surface of the shortened wall 223. At the same stage, the distal wall portion 144 abuts the arcuate wall 225 of the housing 20. The resisting post 126 is aligned with a switch (not shown) of a circuit board for an electronic device.

To depress the protrusion 124, because the assembly wall 14 of the key 10 is securely latched within the housing 10, the contact body 12 bends relative to the assembly wall 14 and moves towards the inner lateral side of the shortened wall 223 until the resisting post 126 abuts the switch. At this time, the electronic device is activated. After release of the protrusion 124, the contact body 12 returns to its original position by way of release of the accumulated elastic force of the contact body 12.

It should be understood that the assembly slot 142 can be omitted, whereupon the assembly wall 14 is latched between the column 242 and the shortened wall 223.

It should further be understood that the connecting wall 13 can be omitted, whereupon the assembly wall 14 connects to the contact body 12 directly.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A key assembly for an electronic device, comprising:
    an elastic key, comprising a contact body and an assembly wall integrally formed with the contact body, the assembly wall having an arcuate distal wall portion;
    a housing comprising a shortened wall defining an aperture therein, an arcuate wall connecting to the shortened wall, and a bottom wall protruding a column adjacent to the shortened wall;
    wherein the assembly wall defines an assembly slot for latching the column, the contact body comprises a protrusion, the key is mounted into the housing, the column latched into the assembly slot, the arcuate distal wall portion abuts the arcuate wall, the contact body abuts the shortened wall and the protrusion protrudes out of the aperture.

2. The key assembly for an electronic device as claimed in claim 1, wherein the key includes a connecting section, two ends of which connect the contact body and the assembly wall respectively.

3. The key assembly for an electronic device as claimed in claim 1, wherein the bottom wall forms a support block between the column and the shortened wall, the support block configured for supporting the assembly wall after the key is assembled in the housing.

4. The key assembly for an electronic device as claimed in claim 1, wherein the contact body includes a main board and a resisting post protruding from the interior lateral surface of the main board, and the protrusion is formed on the exterior lateral surface of the main board.

5. A key assembly for an electronic device, comprising:
   a key comprising a contact body having a protrusion, and an assembly wall integrally formed with the contact body, the assembly wall having an arcuate distal wall portion;
   a housing comprising a shortened wall defining an aperture therein, an arcuate wall connecting to the shortened wall, and a bottom wall protruding from a column adjacent to the shortened wall;
   wherein the key is mounted to the housing, the assembly wall is clamped between the column and the shortened wall, the arcuate distal wall portion abuts the arcuate wall, the contact body abuts the shortened wall and the protrusion protrudes out of the aperture.

6. The key assembly for an electronic device as claimed in claim 5, wherein the assembly wall defines an assembly slot therein, and the assembly slot latches with the column after the key is assembled in the housing.

7. The key assembly for an electronic device as claimed in claim 5, wherein the key includes a connecting section, two ends of which connect the contact body and the assembly wall respectively.

8. The key assembly for an electronic device as claimed in claim 6, wherein the bottom wall forms a support block between the column and the shortened wall, the support block configured for supporting the assembly wall after the key is assembled in the housing.

9. The key assembly for an electronic device as claimed in claim 6, wherein the contact body includes a main board and a resisting post protruding from the interior lateral surface of the main board, wherein the protrusion is formed on the exterior lateral surface of the main board.

* * * * *